US011243655B2

(12) United States Patent
Schoenfelder et al.

(10) Patent No.: US 11,243,655 B2
(45) Date of Patent: Feb. 8, 2022

(54) OCCUPANT AND GUEST INTERACTION WITH A VIRTUAL ENVIRONMENT

(71) Applicant: Latch, Inc., New York, NY (US)

(72) Inventors: Luke Andrew Schoenfelder, New York, NY (US); Ivan Almaral Sole, New York, NY (US)

(73) Assignee: LATCH SYSTEMS, INC., New York, NY (US)

(*) Notice: Subject to any disclaimer, the term of this patent is extended or adjusted under 35 U.S.C. 154(b) by 0 days.

(21) Appl. No.: 16/689,608

(22) Filed: Nov. 20, 2019

(65) Prior Publication Data
US 2020/0159387 A1 May 21, 2020

Related U.S. Application Data

(60) Provisional application No. 62/770,104, filed on Nov. 20, 2018.

(51) Int. Cl.
| | |
|---|---|
| G06K 9/00 | (2006.01) |
| H04W 4/021 | (2018.01) |
| G06T 19/00 | (2011.01) |
| G06F 3/0481 | (2022.01) |
| G06F 9/54 | (2006.01) |
| G06F 3/0488 | (2022.01) |

(52) U.S. Cl.
CPC ........ *G06F 3/04815* (2013.01); *G06F 3/0488* (2013.01); *G06F 9/542* (2013.01); *G06T 19/006* (2013.01); *G06V 20/20* (2022.01); *H04W 4/021* (2013.01)

(58) Field of Classification Search
CPC .... G06F 3/04815; G06F 3/0488; G06F 9/542; G06K 9/00671; G06T 19/006; H04W 4/021
See application file for complete search history.

(56) References Cited

U.S. PATENT DOCUMENTS

| | | | |
|---|---|---|---|
| 6,971,029 B1 | 11/2005 | Avery, IV et al. | |
| 8,358,197 B2 | 1/2013 | Tran | |
| 10,083,559 B2 | 9/2018 | Schoenfelder et al. | |
| 10,157,504 B1 * | 12/2018 | Jain | G06F 21/31 |
| 2002/0147924 A1 | 10/2002 | Flyntz | |
| 2004/0041019 A1 | 3/2004 | Schneider et al. | |
| 2007/0038727 A1 | 2/2007 | Bailey et al. | |

(Continued)

FOREIGN PATENT DOCUMENTS

WO    WO-2015/130809 A1    9/2015

OTHER PUBLICATIONS

International Search Report and Written Opinion dated Mar. 3, 2020 received in related PCT/US2019/062397 filed Nov. 20, 2019 (13 pages).

*Primary Examiner* — Jennifer N Welch
*Assistant Examiner* — Amy P Hoang
(74) *Attorney, Agent, or Firm* — Kacvinsky Daisak Bluni PLLC

(57) ABSTRACT

Systems and methods for occupant and guest interaction with a virtual environment are provided. Disclosed systems and methods enable occupants to create an event associated with a particular location in an area within a virtual environment. Graphical interfaces and display methods can display interactive event markers overlaying images of the area within the virtual environment.

34 Claims, 20 Drawing Sheets

(56) References Cited

U.S. PATENT DOCUMENTS

| | | |
|---|---|---|
| 2007/0146118 A1 | 6/2007 | Rodriguez et al. |
| 2013/0120109 A1 | 5/2013 | Libin et al. |
| 2014/0062656 A1 | 3/2014 | Bowen et al. |
| 2014/0278642 A1 | 9/2014 | Robinson et al. |
| 2016/0300387 A1 | 10/2016 | Ziman |
| 2017/0061442 A1 | 3/2017 | Barlow et al. |
| 2017/0124792 A1* | 5/2017 | Schoenfelder ......... G06K 7/087 |
| 2017/0262802 A1* | 9/2017 | Swanson ................. H04W 4/02 |
| 2017/0270794 A1 | 9/2017 | Sweeney |
| 2017/0353741 A1* | 12/2017 | Ogle .................. H04N 21/8146 |
| 2019/0114692 A1* | 4/2019 | Briggs ................... H04W 4/02 |
| 2019/0197599 A1* | 6/2019 | Zia ........................ G06T 19/006 |

* cited by examiner

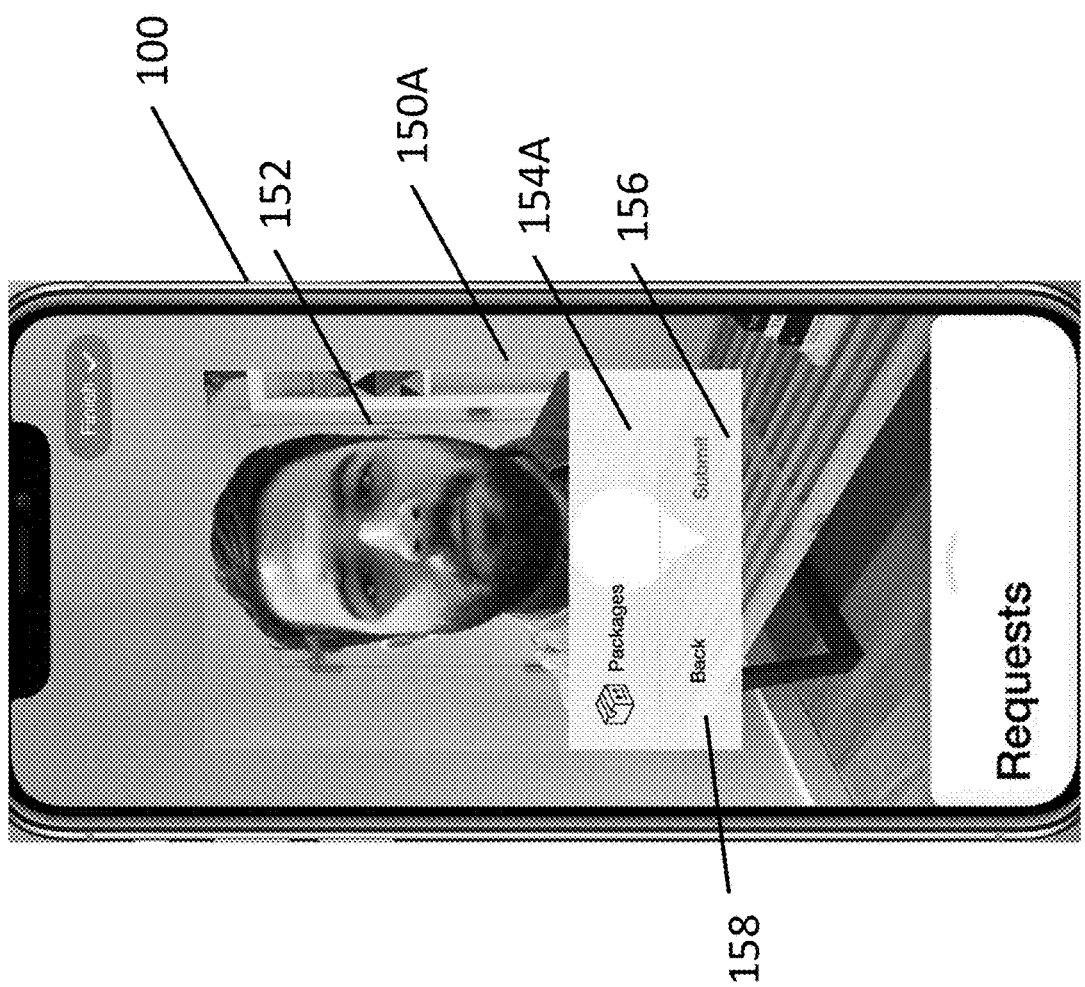

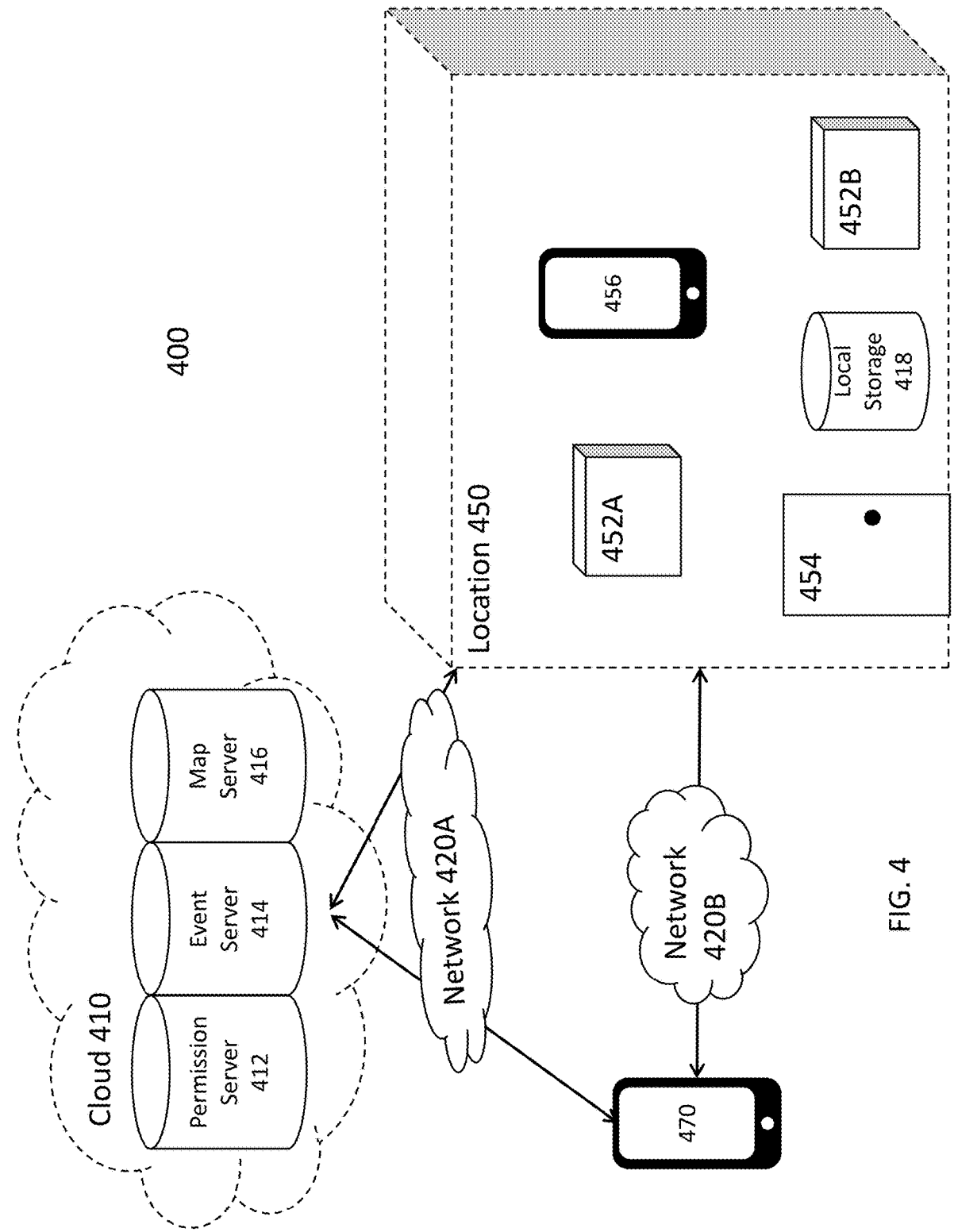

OCCUPANT AND GUEST INTERACTION WITH A VIRTUAL ENVIRONMENT

CROSS REFERENCE TO RELATED APPLICATIONS

This application claims the benefit under 35 U.S.C. § 119(e) to U.S. Provisional Application No. 62/770,104, entitled "OCCUPANT AND GUEST INTERACTION WITH A VIRTUAL ENVIRONMENT," filed on Nov. 20, 2018, the content of which is incorporated by reference herein in its entirety.

TECHNICAL FIELD

The present disclosure relates to virtual environments, and more specifically to creating and interacting with location-specific events in virtual environments.

BACKGROUND

Occupants of locations, such as residents in houses or apartments, frequently provide access to guests, such as service providers. For example, a resident can hire a plumber to fix a leaky sink at their residence or a maid service to clean a particular part of their residence.

Traditionally, the resident communicates such requests directly to a service provider and must ensure that the service provider can gain access to the residence to perform the requested service. Some residents remain at their residence during a service request to ensure that the service provider has access and understands the requested service. This can cause significant inconvenience to the resident, especially if the service provider gives a broad window for when they plan to perform the requested service. Other residents hide keys, or leave access points to the residence unlocked to provide access to the service provider and rely on handwritten notes or previous communications with the service providers to provide information about the requested service. Such practices can be insecure, time consuming, inefficient, and prone to error, for example, if a service provider provides the requested service on the wrong item in the residence (e.g., fixes the wrong sink).

SUMMARY

In some embodiments, a method includes displaying, on a user interface of a mobile device, at least one image of a portion of an area; receiving, via the user interface, a selection of a location on the at least one image of the portion of the area; identifying, a physical location associated with the selected location; determining, based on at least one permission stored in a permissions database, that the user is authorized to submit a service request in association with at least one of the identified physical location or the area; displaying, on the user interface, two or more service request types; receiving, via the user interface, a selection of at least one service request type of the two or more service request types; and storing, in an event database, an event comprising: an indication of the identified physical location, and an indication of the at least one service request type.

In some embodiments the method further includes updating, in the permissions database, one or more permissions to enable a service provider to gain access to the at the event.

In some embodiments the method further includes updating, in the permissions database, one or more permissions to enable a service provider to gain access to an access point associated with the at least one of the physical location or the area.

In some embodiments the method further includes receiving, via the user interface, at least one of video or text instructions associated with the at least one service request type.

In some embodiments the method further includes displaying, on the user interface, at least one service request subtype; and receiving, via the user interface, a selection of one or more of the at least one service request subtype.

In some embodiments the method further includes displaying, on the user interface, an event marker associated with the event in the selected location on at least one image of the portion of the area.

In some embodiments the method further includes displaying, on the user interface, at least one of a second event marker associated with a second event stored in the event database or a direction to a second event marker associated with a second event stored in the event database.

In some embodiments the method further includes displaying an event list on the user interface, the displayed event list comprising: a list entry associated with the event; and a list entry associated with at least one second event stored in the event database.

In some embodiments the identifying at least one physical location associated with the selected location comprises locating a corresponding location on a virtual map representing the area.

In some embodiments the virtual map representing the area comprises a virtual 3D map of the area.

In some embodiments the user interface comprises a touch screen with a graphical display.

In some embodiments at least one of the event database or the permissions database are in a location remote from the area.

In some embodiments at least one of the event database or the permissions database are within the area.

In some embodiments a method includes receiving, by a user mobile device, at least one image of a portion of an area from at least one camera of the user mobile device; identifying a physical location of the portion of the area in the at least one image; determining, based on at least one permission stored in a permissions database, that the user of the user mobile device is authorized to view events associated with at least one of the identified physical location or the area; identifying, in at least one event database, events having an associated location at at least one of the identified physical location of the portion of the area in the at least one image or the area; displaying, on a graphical user interface of the user mobile device, at least one interactive event marker associated with the at least one identified event overlaid in the identified physical location in the at least one image.

In some embodiments the method further includes granting a user of the mobile device access to an access point associated with the area based on at least one permission stored in the permissions database.

In some embodiments the locating, in the at least one event database, events having an associated location at the identified physical location of the portion of the area in the at least one image comprises transmitting a request for a list of events based on at least one of the identified physical location or the area.

In some embodiments the identifying the physical location of the portion of the area in the at least one image comprises locating a corresponding location on a virtual map representing the area.

In some embodiments the method further includes receiving, from a user, a selection of one of the at least one interactive event marker; and displaying, on the graphical user interface, information associated with the event associated with interactive event marker.

In some embodiments the information comprising one or more of video, text instructions, an event type, or an indication of a device associated with the event.

In some embodiments the method further includes displaying, on the user interface, a direction to at least one second interactive event marker associated with a second event stored in the at least one event database.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIGS. 1A-1M show an exemplary interface with which an occupant can interact with a virtual and/or augmented environment, according to some embodiments.

FIG. 4 is a system diagram of a virtual and/or augmented environment system, according to some embodiments.

DESCRIPTION

According to embodiments of the present invention, systems and methods are disclosed that enable an occupant to associate events with particular locations for use by guests. Occupants can include individuals that have some level of temporary or permanent access privileges to one or more locations. Examples of such individuals include but are not limited to homeowners or tenants of a house or an apartment, a hotel guest, an employee or owner of a business, a representative of a management company associated with a building or physical space, or other similar individuals. Locations can include, but are not limited to, houses, apartments, businesses, real property, vehicles, freight systems (e.g., airplanes, trains, or boats), or similar locations to which access may be limited to some individuals.

According to some embodiments, occupants may want to provide access to a location to guests for a particular purpose. For example, a homeowner may wish to provide a service provider, such as a repairperson or a delivery person, with access to their home for particular tasks, such as delivering a package or for repairs, e.g., inspecting and repairing a broken light. According to some embodiments, guests can include, but are not limited to individuals seeking access to the location to conduct a repair (e.g., of a fixture or item in the location), deliver an object (e.g., package or groceries), visit the location (e.g., a tourist or a hotel guest), retrieve an object (e.g., a dogwalker seeking to retrieve a dog for walking), a service provider (e.g., a cable technician or a cleaning service), or other types of individuals. According to some aspects of the present disclosure, a system can allow the occupant to interact with a virtual environment in the location and provide virtual information and/or augmented information about particular events to guests who visit the location. According to some embodiments, tasks can simply include interacting with the virtual environment based on permissions granted by the occupant and does not require completion of physical tasks in the location by guests.

FIGS. 1A-1M show exemplary interfaces with which an occupant can interact with a virtual environment and/or augmented environment, according to some embodiments. According to some embodiments, the interface 100 can be an electronic device, such as a touch screen display, and can be implemented on a mobile or portable device. A skilled artisan would understand that the interface 100 could be implemented in a number of different technologies such as, but not limited to, virtual reality glasses, tablets, laptops, personal computers, and smart watches. Interface 100 can be part of a virtual and/or augmented environment system, as discussed in more detail with reference to FIG. 4.

Figure 1A:
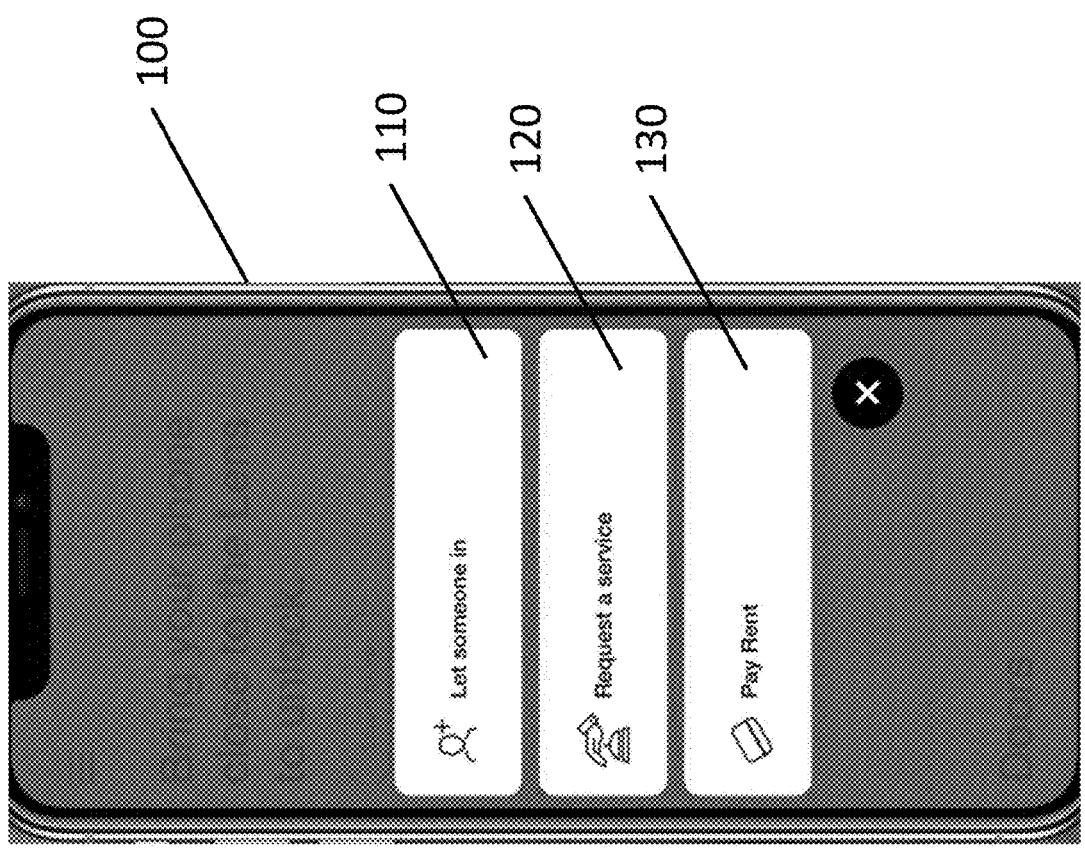

As shown in FIG. 1A, an occupant can choose between a number of options 110, 120, and 130 on the interface 100. Option 110 can correspond to allowing a guest access to the location, and can operate, for example, in accordance with the systems and methods described in U.S. application Ser. No. 15/342,911, the entire contents of which are incorporated herein by reference. Option 130 can, for example, allow an occupant to pay rent for access to the location. According to some embodiments of the present disclosure, option 120 can initiate creation of an event for use by the occupant and a guest in a virtual and/or augmented environment system. As shown in FIG. 1A, events can take the form of a service request. However, based on the present disclosure, a skilled artisan would understand that other types of events could be included.

Figure 1B:
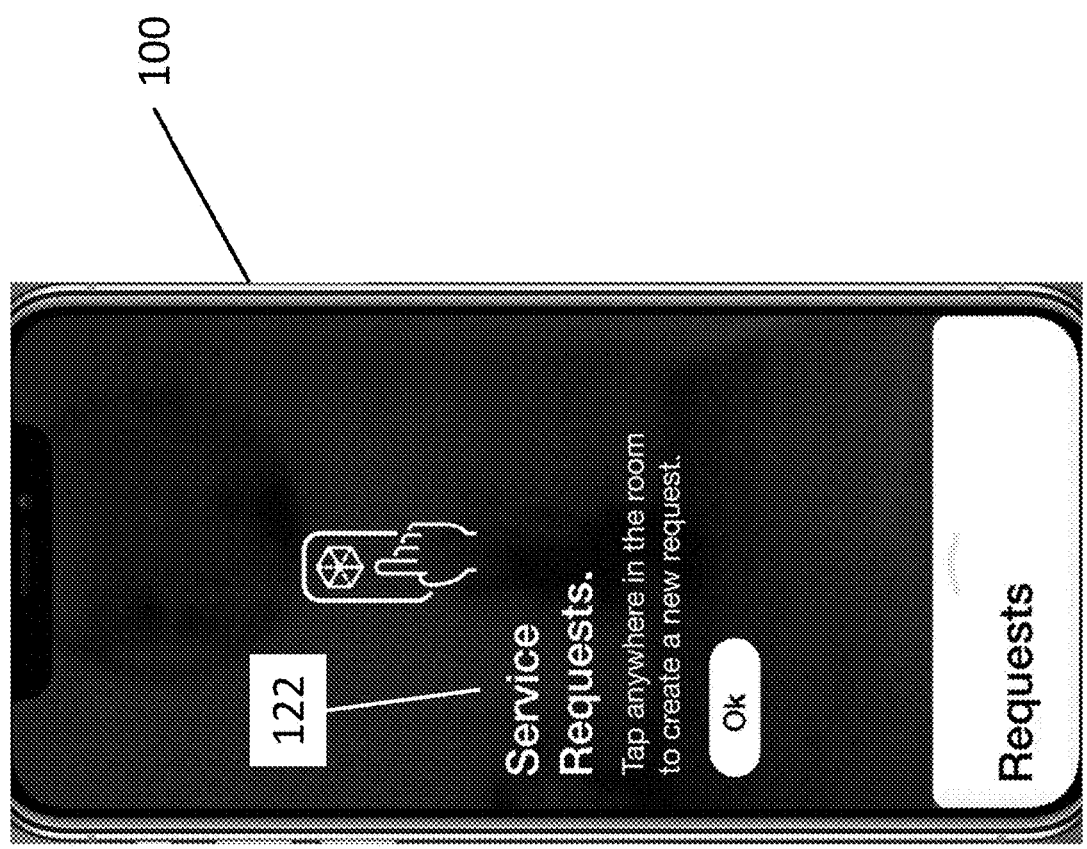

As shown in FIG. 1B, after selection option 120, the occupant interface 100 can display a message 122 instructing the occupant to interact with a virtual environment and/or augmented environment to initiate a service request. After accepting the message 122, the occupant an begin creating a service request.

Figure 1C:
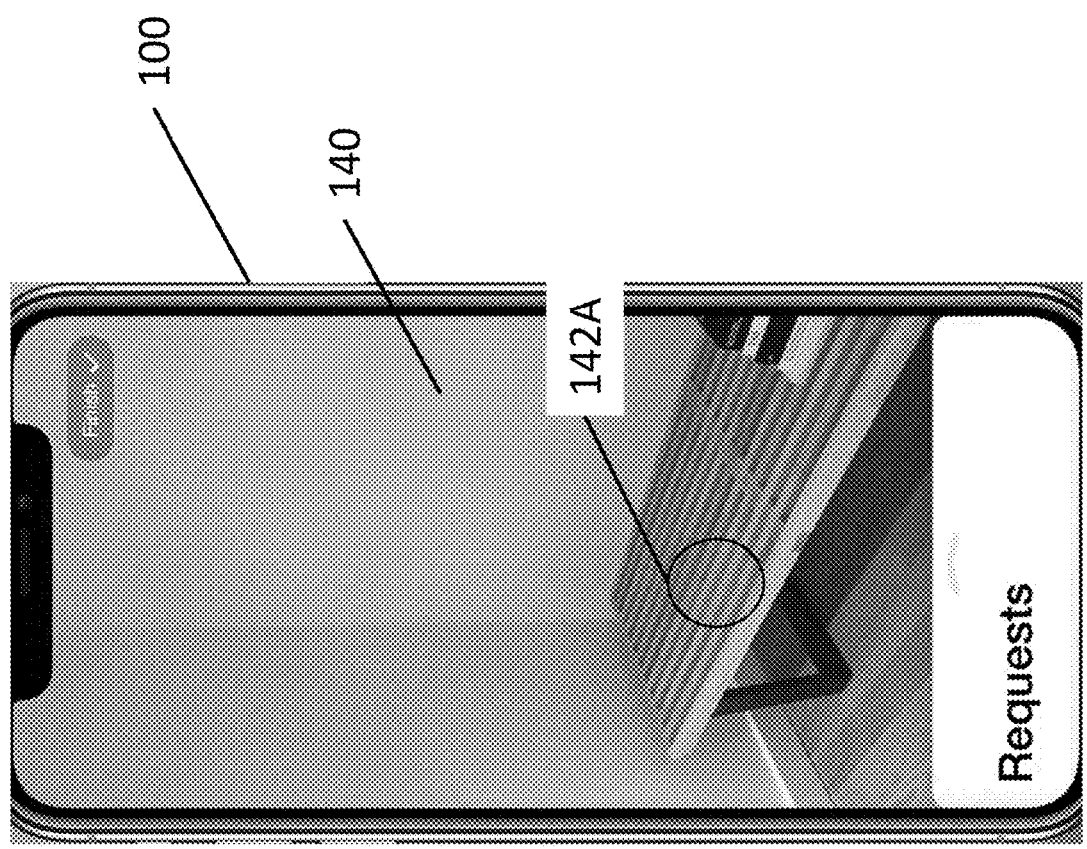

FIG. 1C shows an exemplary virtual environment and/or augmented environment 140 on the interface 100, according to some embodiments. As shown in FIG. 1C, the virtual environment and/or augmented environment can be a video image of the location retrieved by a camera in real time on the interface 100. For example, exemplary virtual environment and/or augmented environment 140 shows a bench and some books. An occupant can interact with the virtual environment and/or augmented environment 140 to initiate the creation of an event, such as a service request. In the embodiment of FIG. 1C, interaction can comprise touching the screen of the interface 100 at a point 142A. As discussed in more detail with reference to FIG. 4, the virtual and/or augmented environment system can associate the point 142A (here, a spot on a bench) with physical location information, such as a position on a map associated with the location. This physical location information allows both the occupant and the guest to interact with the event to be created in the virtual environment and/or augmented environment 140. To determine the location of the point 142A, the device displaying the user interface 100 can triangulate a location based on communication with other wireless devices, and can also use built in sensors such as GPS, motion, and other sensors to determine a particular physical location. According to some embodiments, cameras, sound, light, or a combination thereof are used to identify a distance between the physical object associated with the point 142 and the occupant's device in order to determine an offset to the physical object from the physical location where the user interface resides.

Figure 1D:
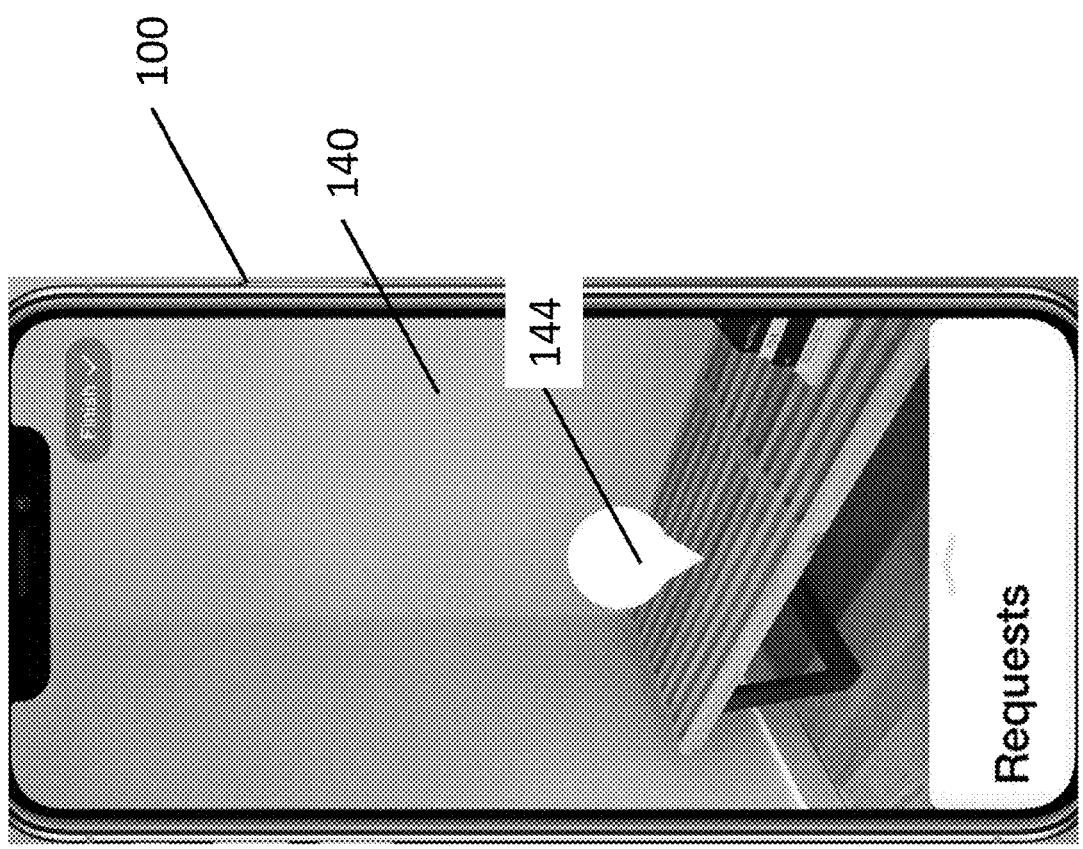

FIG. 1D shows an event marker 144A created in the virtual environment and/or augmented environment 140 by touching the spot 142A on the interface 100, according to some embodiments. As shown in FIG. 1D, event marker 144A can be displayed at a physical location in the virtual environment and/or augmented environment 140 based on the physical location information associated with the event. As the occupant moves the interface 100 (e.g., panning the video image in the location), the event marker 144A will appear approximately stationary in the virtual environment and/or augmented environment 140.

Figure 1E:
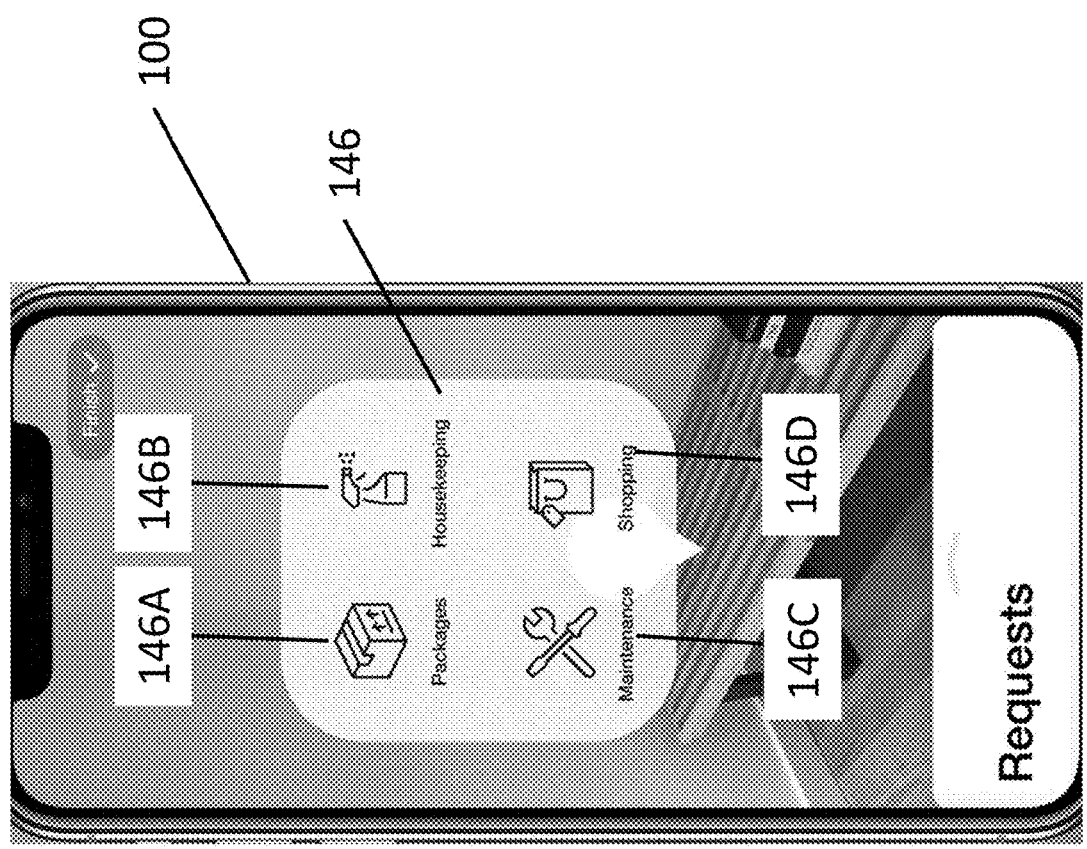

FIG. 1F shows an exemplary menu 146 that can be displayed either when the event marker 144A is created or based on an occupant's interaction with the event marker 144A (e.g., by touching it in the virtual environment and/or augmented environment 140), according to some embodiments. As shown in FIG. 1E, the occupant can be presented with options for service types 146A, 146B, 146C, and 146D. According to the embodiment of FIG. 1E, service type 146A corresponds to a package delivery request which can instruct a delivery person to place a package at the physical location associated with the event marker 144A in the virtual environment and/or augmented environment 140. Service type 146B corresponds to a housekeeping request which can instruct a housekeeper to perform a particular type of housekeeping service at the physical location associated with the event marker 144A in the virtual environment and/or augmented environment 140, such as cleaning a stain or polishing furniture. Service type 146C corresponds to a maintenance request to a repairperson to perform a maintenance service at the physical location associated with the event marker 144A in the virtual environment and/or augmented environment 140, such as fixing a light or repairing a piece of furniture. Finally, service type 146D corresponds to a shopping request to a shopper to purchase particular items associated with the physical location associated with the event marker 144A in the virtual environment and/or augmented environment 140, such as purchasing food from a grocery store.

Figure 1G:
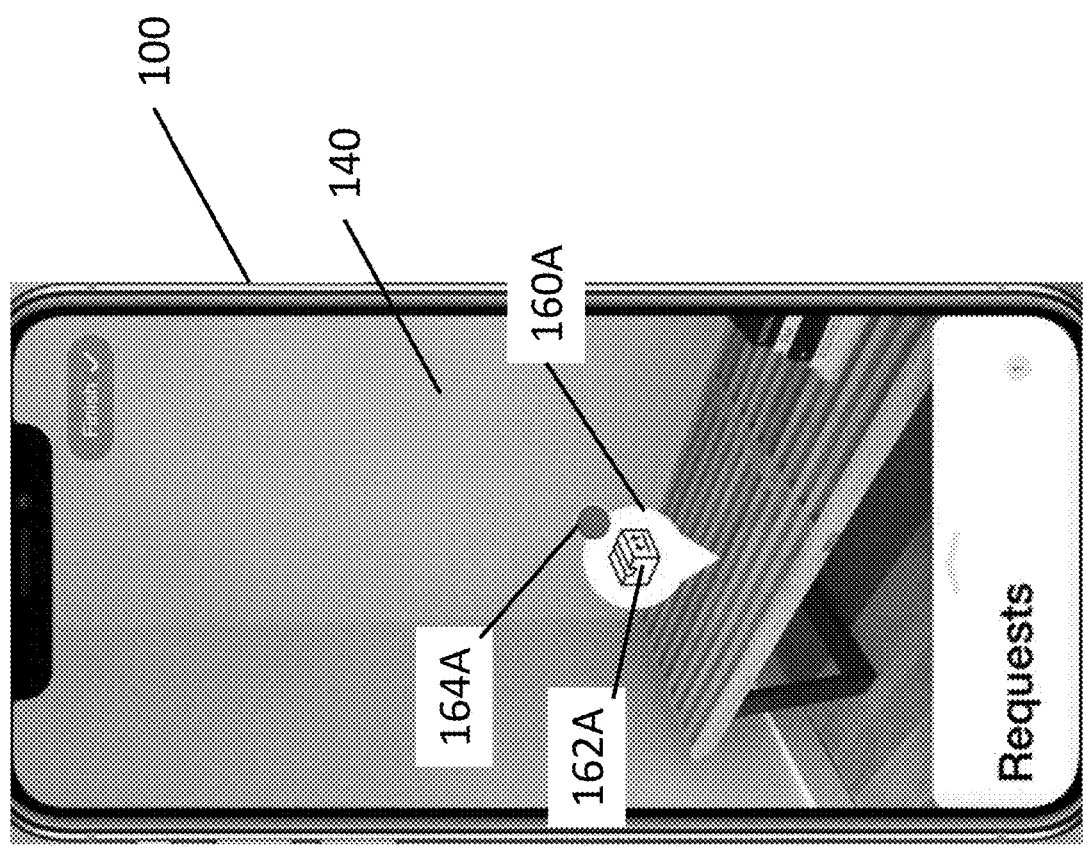

As shown in FIG. 1G, selection of the service type 146A can trigger displaying of the menu 150A, according to some embodiments. Menu 150 shows the service type 154 (packages), and a window 152 that allows the occupant to record video and audio instructions to be associated with the event marker 144A. According to some embodiments, the window 152 can instead or additionally comprise a number of different options or interfaces that allow for the occupant to communicate a particular requested service to a guest, such as a menu with items associated with the service type 146A, a text box for inputting text instructions or information, a sound recording interface for recording an audio message, or other types of windows that permit communication of information from the occupant to a guest. This information is stored in association with the evet marker 144A as discussed in more detail with reference to FIG. 4. Menu 150 allows the user to go back to the previously displayed screen with back button 158 or to submit the information recorded via window 152 using submit button 156.

Figure 1H:
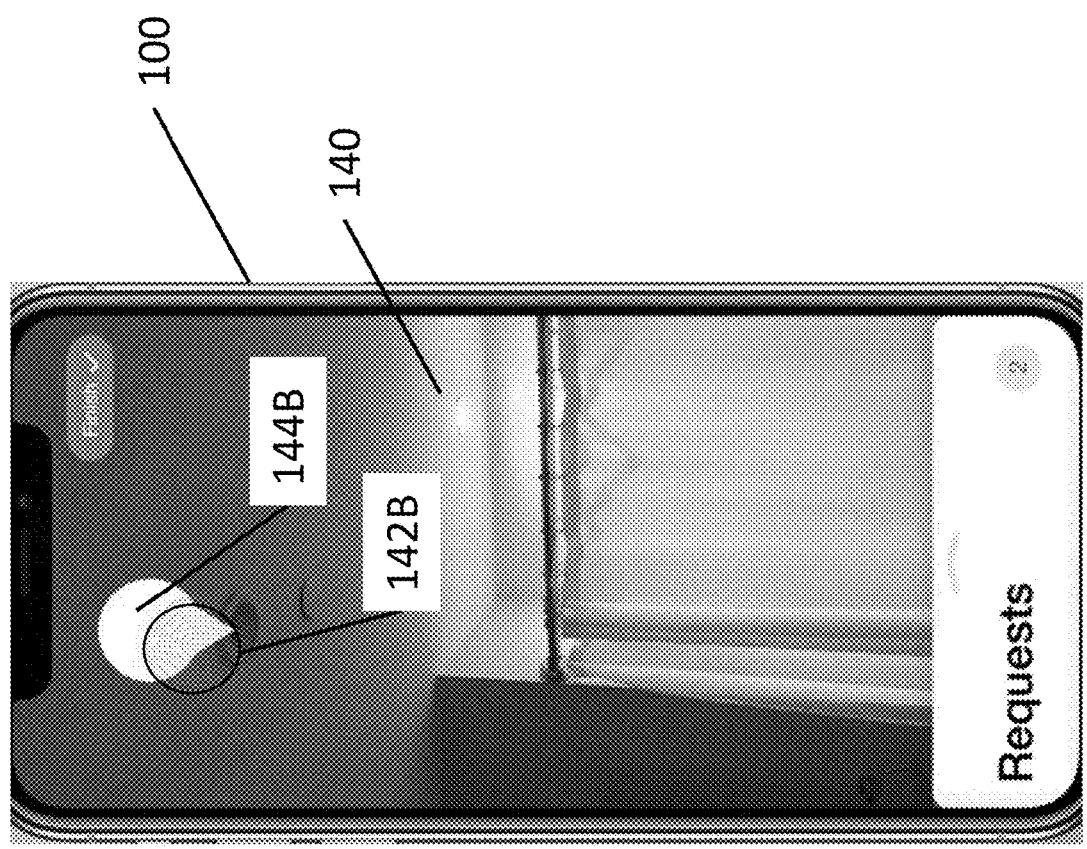

As shown in FIG. 1H, after submitting the service request, event marker 160A is displayed in the virtual environment and/or augmented environment 140 of the interface 100 in place of the event marker 144A, according to some embodiments. Event marker 160A corresponds to the event marker 144A, but is associated with one or more of the service type discussed with reference to FIG. 1E and the recorded information discussed with reference to FIG. 1F. According to some embodiments, the event marker 160A shows an icon 162A, such as a package, that indicates the type of service request to make identifying this information in the virtual environment and/or augmented environment 140 easier. The event marker 160A can also include a status indicator 164A, such as a colored dot, indicating the status of the service request. The status indicator can communicate information such as, but not limited to, completion status, expected time until completion, cost of completion, number of guests that have interacted with the event marker 160A, or any other relevant information to the event marker 160A and the event associated therewith.

Figure 1I:
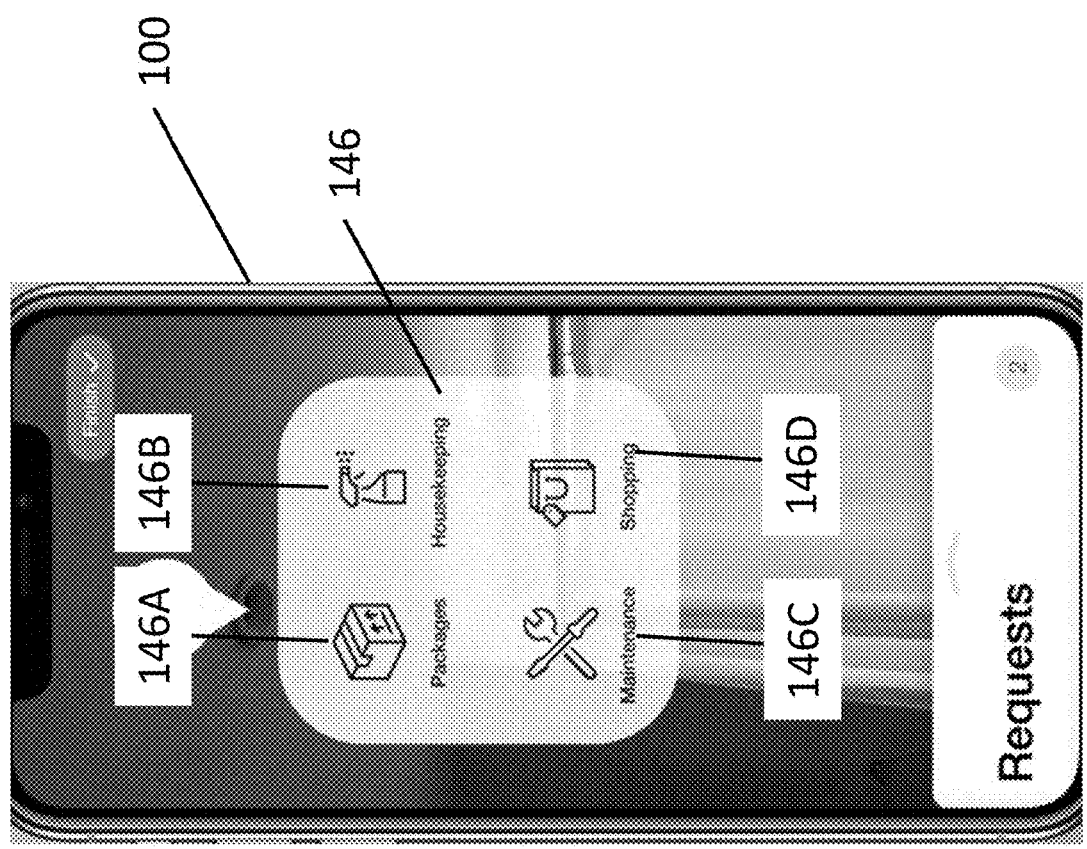
Figure 1J:
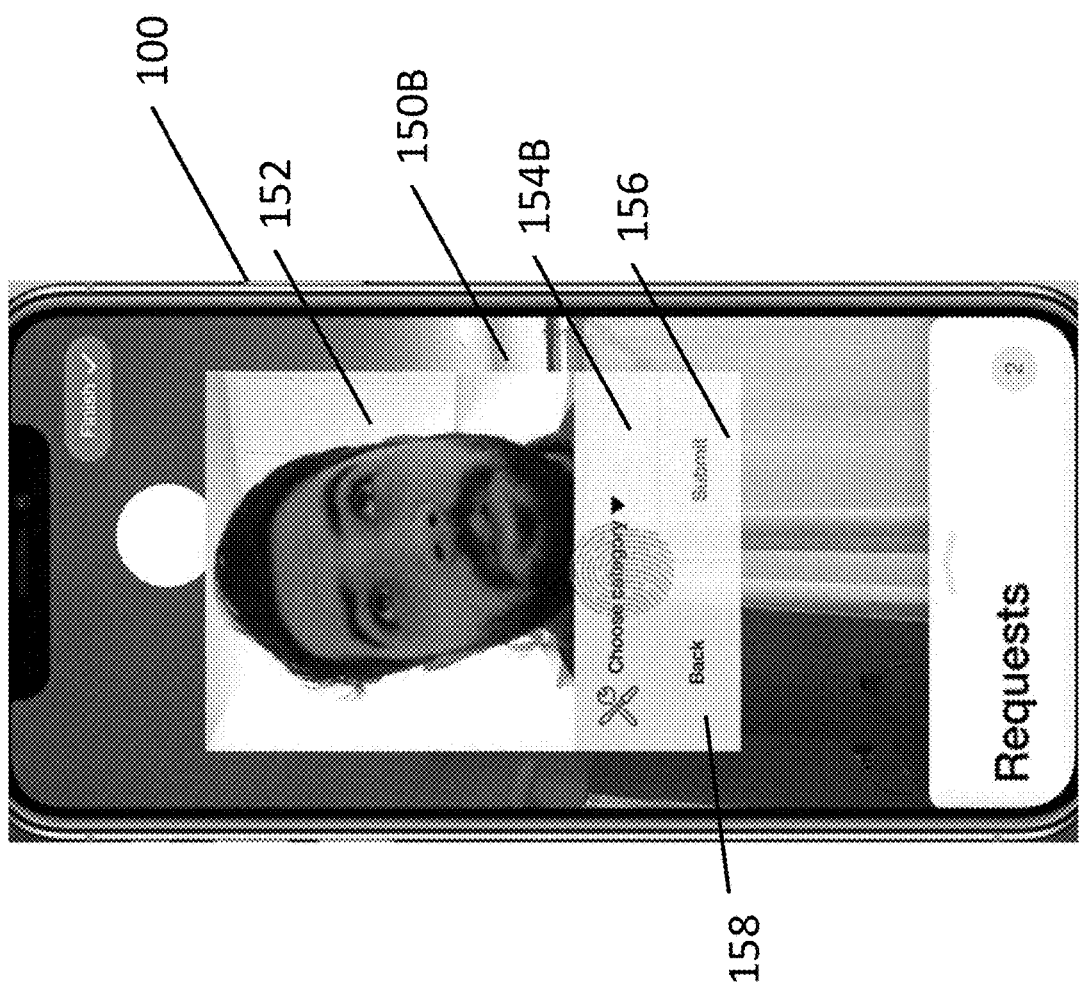

FIG. 1I shows creation of another event marker 144B in associated with a light bulb by interacting with the virtual environment and/or augmented environment 140 at point 142A, according to some embodiments. FIG. 1J shows the menu 146 discussed in more detail with reference to FIG. 1E. According to some embodiments, the occupant can select option 146C corresponding to a maintenance request.

As shown in FIG. 1J, after selection of option 146C, the menu 150B can be displayed on the interface 100, according to some embodiments. Menu 150B has similar options 152, 156, and 158 to menu 150A, except that 154B corresponds to a selectable menu to choose a subcategory for the service request associated with option 146C.

Figure 1K:
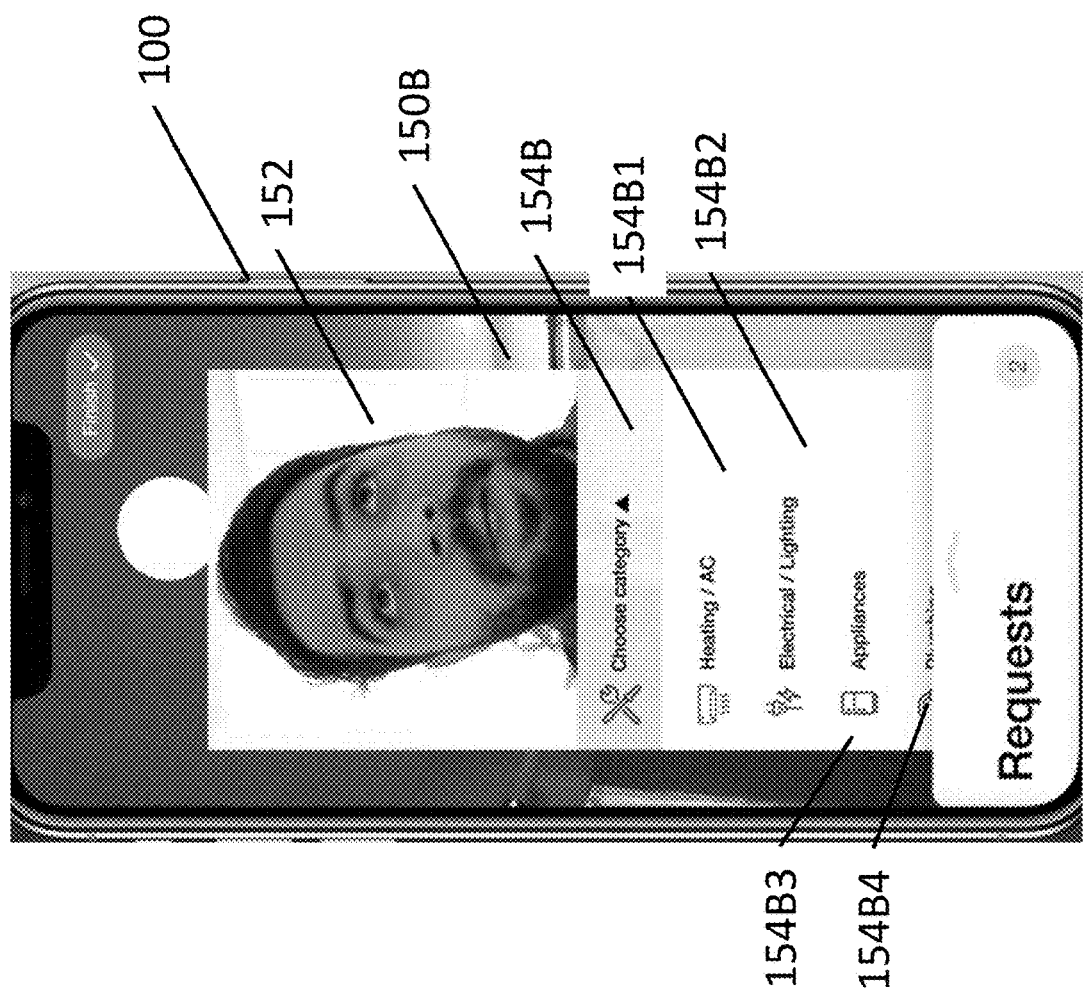

As shown in FIG. 1K, upon selection of option 154B, a menu having subcategory options 154B1-154B4 is displayed on the user interface 100, according to some embodiments. Options 154B1-154B4 correspond to subcategories of maintenance requests, including heating/AC, electrical/lighting, appliances, and plumbing, respectively. These subcategories are merely exemplary, and can vary based on the selected service type and based on preferences of those implementing the system. According to some embodiments, only the selectable menu 154B as shown expanded in FIG. 1K is displayed without the window 152. For example, for service types such as shopping, the menu 154B can include grocery items such as milk, orange juice, and chicken, which can be selected for purchase. No video or text instructions may be required for such a selection, as identifying items and quantities is sufficient to indicate the desired items for purchase. The displayed subcategories can be displayed based on a number of different sources, such as, but not limited to, information about items known or sensed to be in the location (or even a particular physical spot in proximity to the marker 144B in the location), information about preferences of the occupant, advertisements by third parties in a geographic area associated with the location, a predetermined list of subcategories displayed with the selected service type, or other relevant sources. In response to such service requests, a guest can retrieve the required items and deliver them to the physical location associated with the event.

Figure 1L:
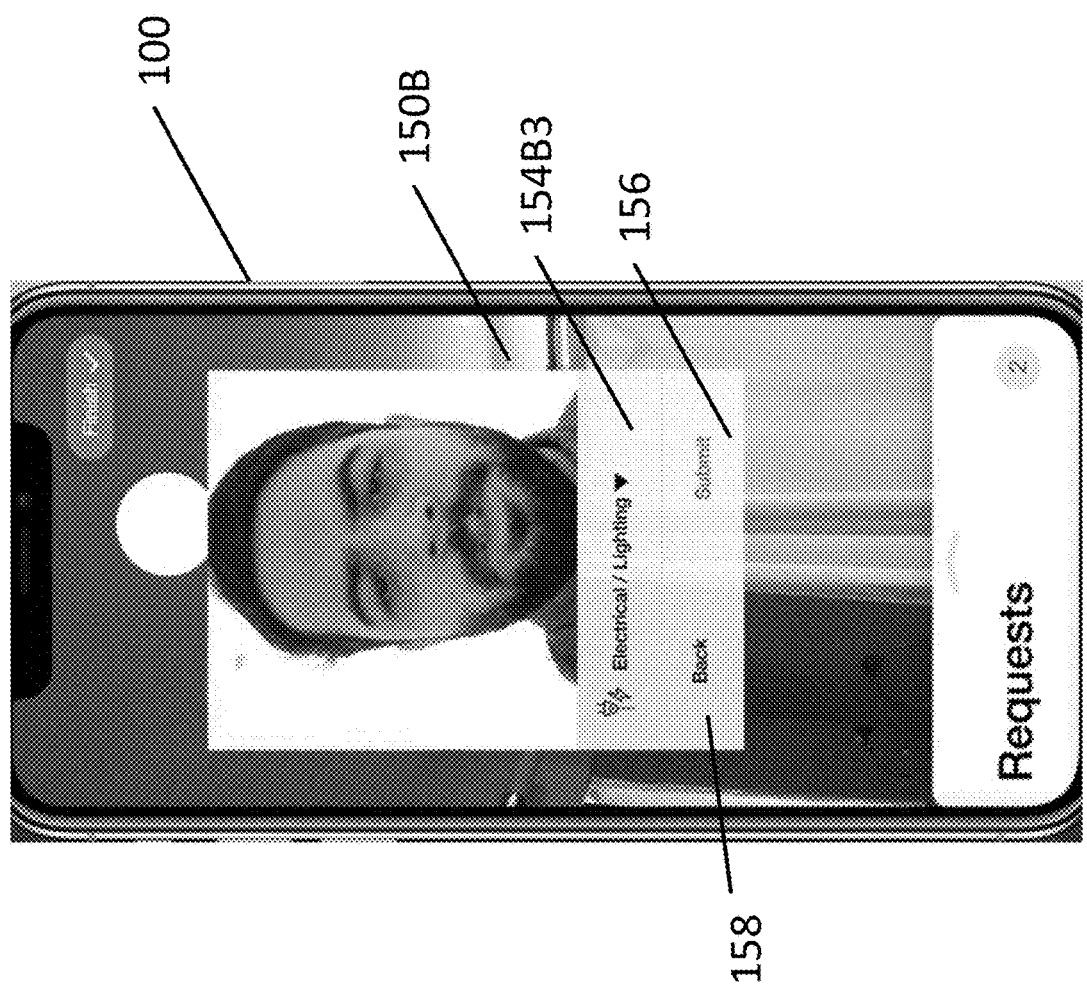
Figure 1M:
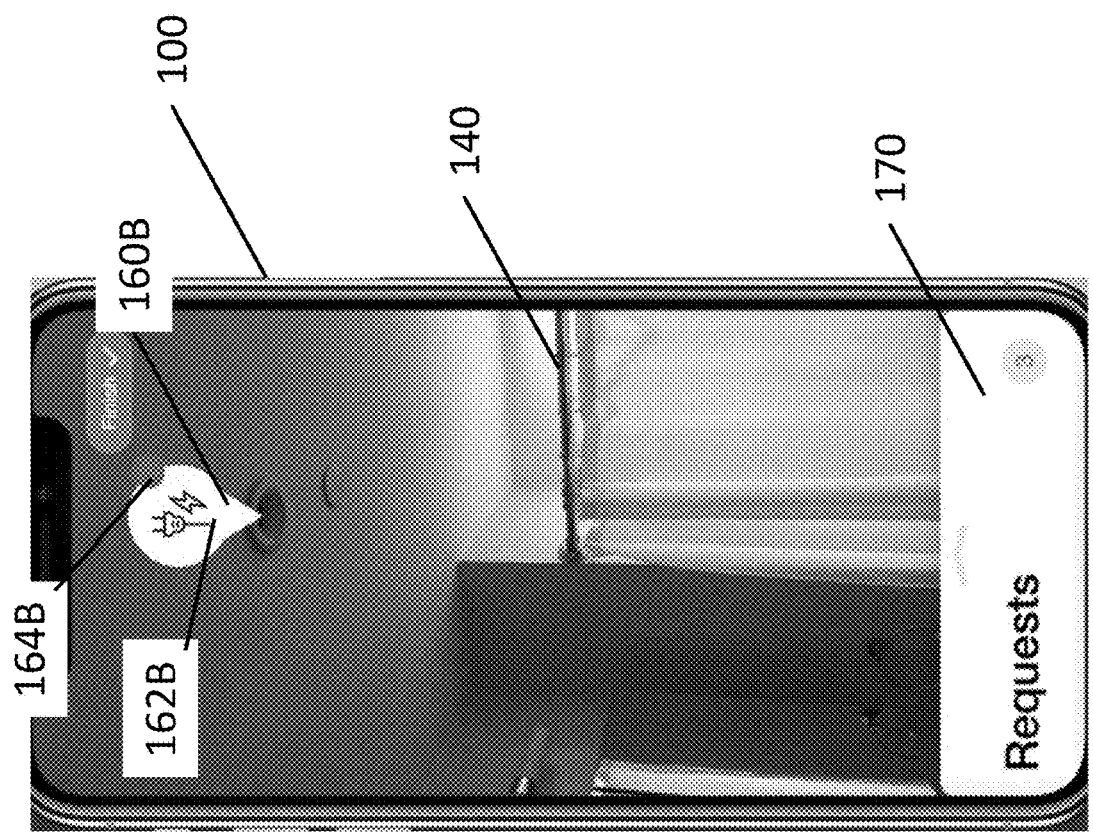

As shown in FIG. 1L, the occupant can select the submit option 156 after selecting a subcategory (here electrical/lighting 154B3), according to some embodiments. In response, as shown in FIG. 1M, an event marker 160B replaces event marker 144B, and is associated with icons 162B and 164B that perform similar functions to icons 162A and 164A discussed with reference to FIG. 1G, according to some embodiments. In addition to creating new events, an occupant can also select requests 170 to show a list of requests.

Figure 2:
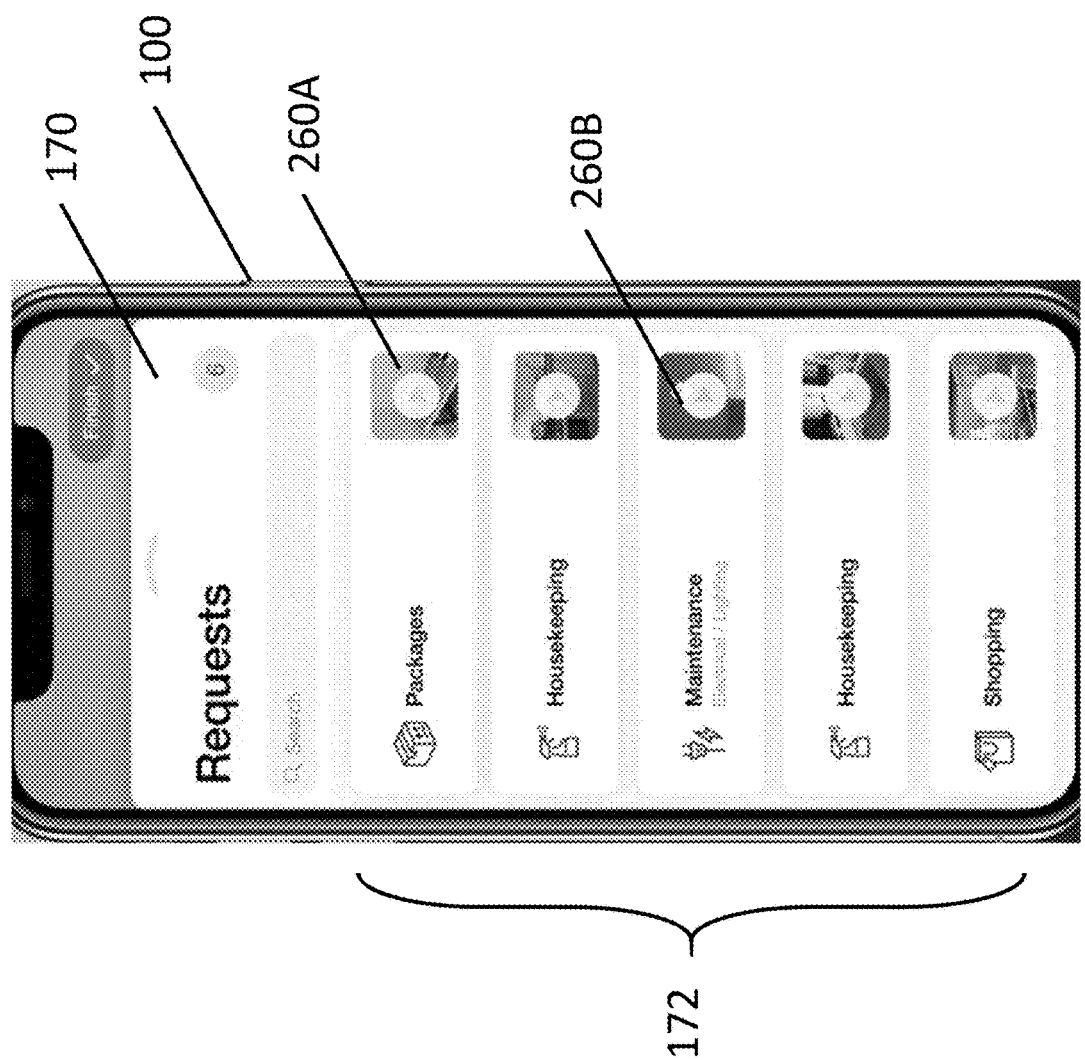
FIG. 2 shows an exemplary list of events, according to some embodiments.

FIG. 2 shows a list of requests 172, according to some embodiments. As shown in FIG. 2, the list of requests 172 shows representations 260A and 260B of the service requests associated with the markers 160A and 160B, respectively. The recorded messages can be accessed from the list of requests 172 by interacting with the representations 260A and 260B (e.g., via the touch screen). According to some embodiments, selecting the representations 260A and 260B can show additional information about the requests associated therewith, such as, but not limited to, timing and location information, authoring occupant information, status information, etc.

FIGS. 3A-3E show various embodiments of a guest interface 300 for a guest to interact with a virtual environment and/or augmented environment as part of a virtual and/or augmented environment system, according to some embodiments. As discussed above, guests can interact with the virtual environment and/or augmented environment by viewing and optionally acting on requests. As discussed in more detail below, acting on requests can include adding information in association with event markers. Furthermore, guests can be limited to interactions with only particular types of event markers, as discussed in more detail with reference to FIG. 4.

Figure 3A:
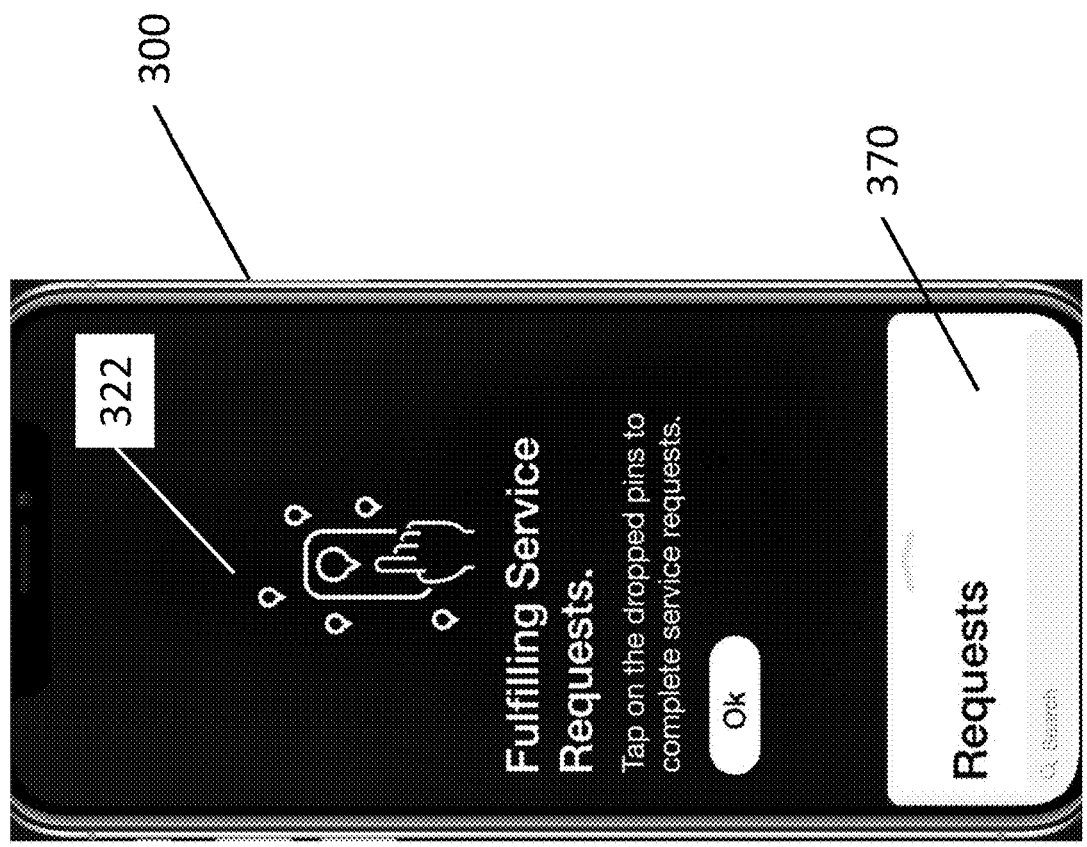
FIGS. 3A-3E show an exemplary interface with which guests can interact with a virtual and/or augmented environment, according to some embodiments.

As shown in FIG. 3A, upon entry into a location, a guest interface 300 can display a message 322 instructing the guest to interact with the virtual environment and/or augmented environment in the location to interact with events, such as service requests. Although the following description discusses service requests, a skilled artisan would understand based on the present disclosure that guests can interact with other types of events using the techniques described herein. After accepting the message 322, the occupant can begin interacting with service requests.

Figure 3B:
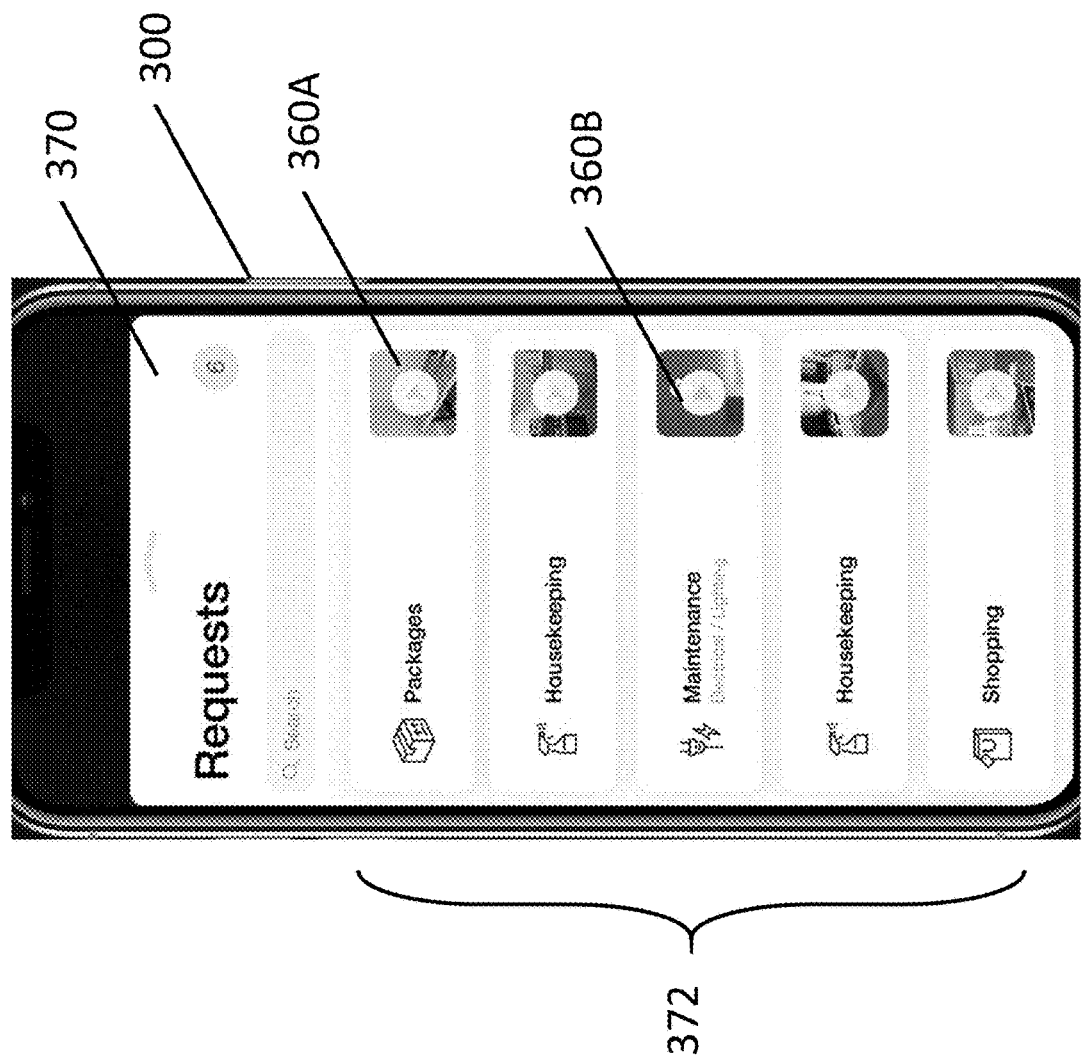

FIG. 3B shows a list of requests 372 on a guest interface 300 with which a guest can interact, according to some embodiments. As shown in FIG. 3B, the list of requests 372 shows representations 360A and 360B of the service requests associated with the markers 160A and 160B, respectively. The recorded messages can be accessed from the list of requests 172. According to some embodiments, selecting the representations 360A and 360B can show the associated recorded messages and/or additional information about the requests associated therewith, such as, but not limited to, timing and location information, status information, authoring occupant information, etc. According to some embodiments, the information accessible from the list of requests 372 is sufficient to complete the associated service request.

Figure 3C:
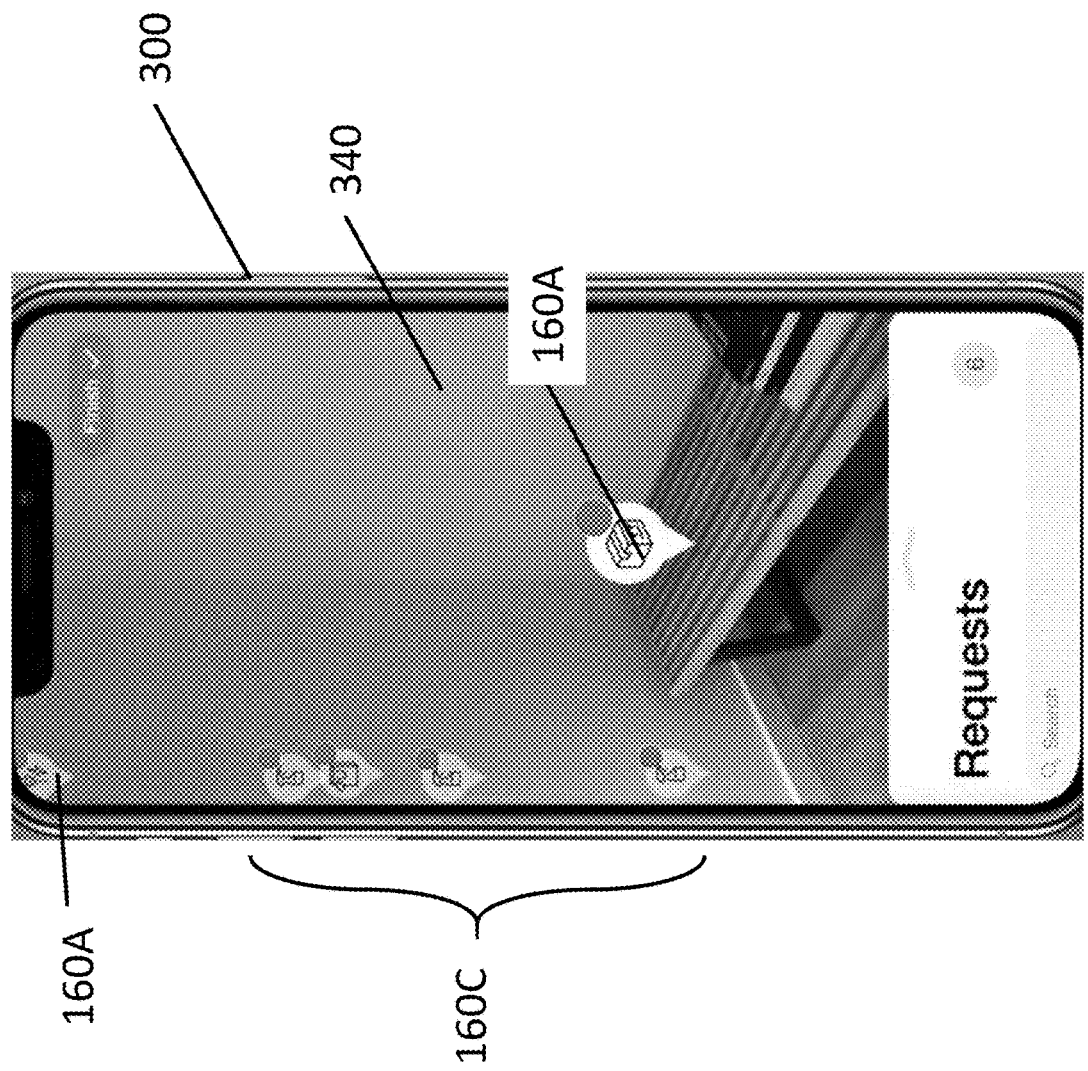

FIG. 3C shows the event marker 160A as seen from the guest interface 300 in the guest's virtual environment and/or augmented environment 340, according to some embodiments. The guest's virtual environment and/or augmented environment 340 allows the guest to interact with events that have been created by an occupant of the location. According to some embodiments, additional event markers 160C can be shown in the virtual environment and/or augmented environment 340. These correspond to additional service requests or events. As shown in FIG. 3C, the location of the additional event markers 160C can show to the guest which direction to move the guest device having the guest interface 300 in order to view the location of the respective event markers 160C. For example, as shown in FIG. 3C, the location of the event markers 160C on the left side of the screen show that the guest should turn left in order to view them or come closer to them. Furthermore, the relative heights of the event markers 160C indicate where, in terms of height, the event markers 160C reside. For example, since the event marker 160B is on the ceiling for a faulty light, it is shown high near the top of the user interface 300.

As discussed in more detail below with reference to FIG. 4, guests can be categorized into different groups that are permitted to interact only with certain types of service requests or events. Thus, for example, a delivery person could be permitted only to see the event marker 160A corresponding to a package delivery request and not the additional event markers 160C shown in FIG. 3C.

Figure 3D:
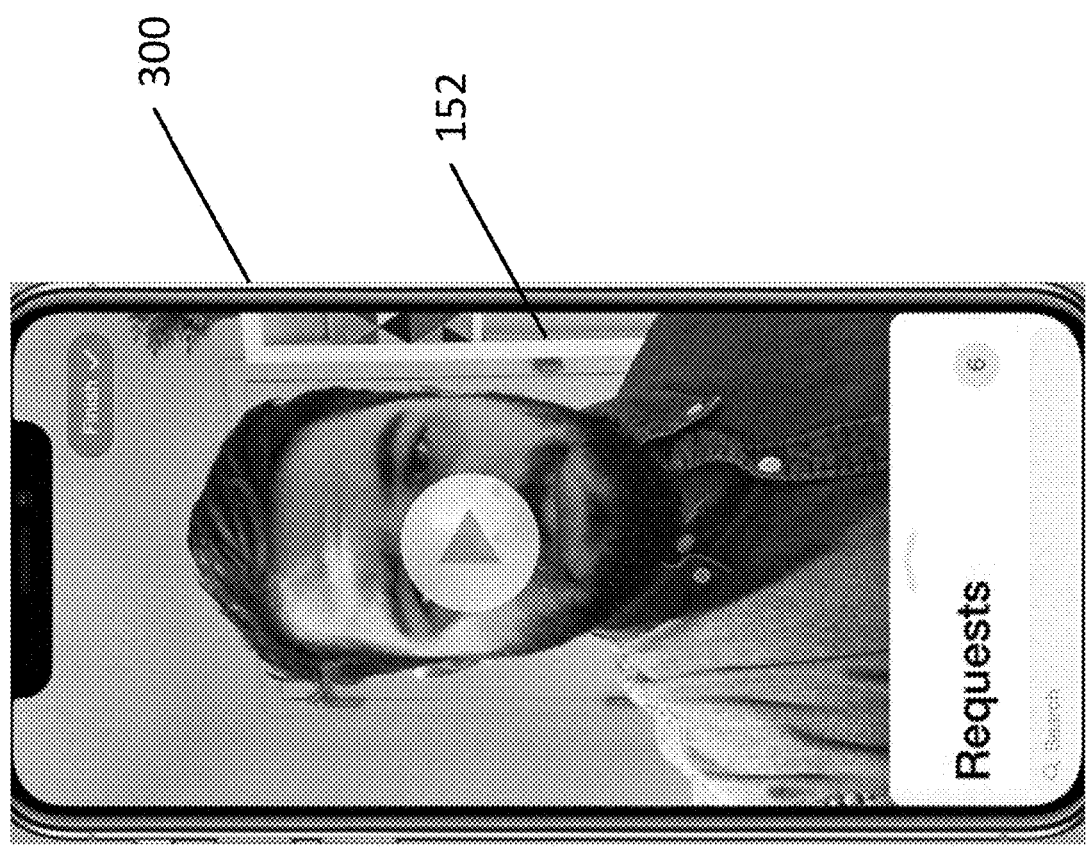

According to some embodiments, touching the event marker 160A on the interface 300 shown in FIG. 3C brings the guest to the representation of the recorded service request shown in FIG. 3D. As shown in FIG. 3D, the representation of the service request associated with the event marker 160A shows an enlarged window 152 that plays the message recorded by the occupant. Accordingly, the occupant can communicate instructions to the guest by leaving them in association with the event marker 160A and granting the guest permission to interact with the event marker 160A.

Figure 3E:
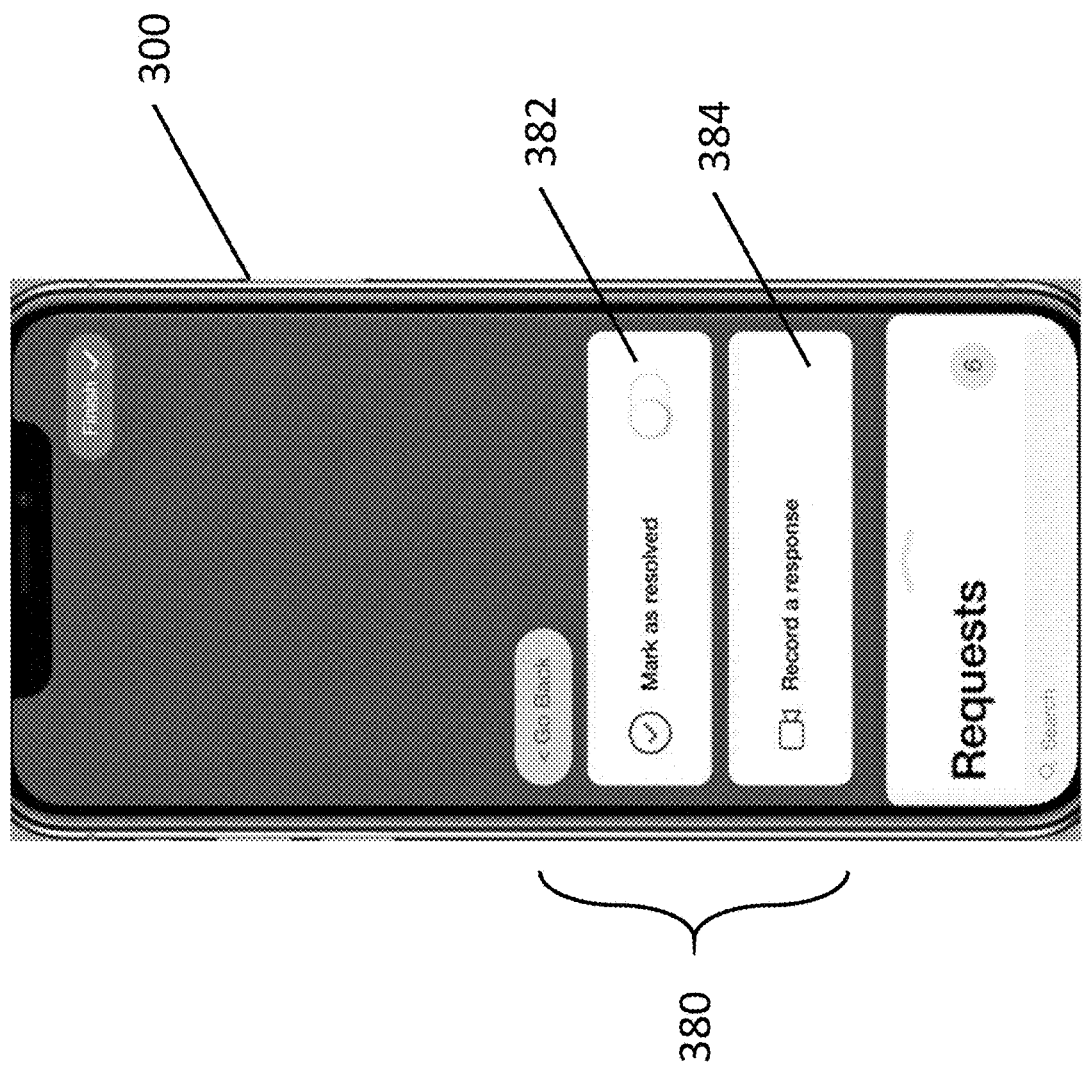

As shown in FIG. 3E, after viewing the message in window 152, the guest can be presented with various options 380 for responding to the service request. For example, the guest can respond by pressing button 382 to mark the request as resolved. According to another example, the guest can respond by recording a response by pressing the button 384. According to some embodiments, the guest can choose multiple options 380. These options are not exhaustive or limiting, and other options are possible. Upon responding to the service request, the occupant can view the response by interacting with the virtual environment and/or augmented environment 140 in a similar way to which the guest interacts with the virtual environment and/or augmented environment 340.

FIG. 4 shows an exemplary system 400 for facilitating the virtual environment and/or augmented environment discussed above. System 400 can include cloud 410, permission server 412, event server 414, map server 416, networks 420A and 420B, at least one location 450, an access point 454, local storage 418, devices 452A and 452B, occupant device 456, and guest device 470. Occupant device 456 can be associated with one or more occupants that have access privileges to location 450. Location 450 can have one or more access point 454 which allows individuals access to the location 450, such as a door. The access point 454 can be equipped with one or more electronic access control devices. Location 450 can also house local storage 418 and devices 452A, 452B. According to some embodiments, devices 452A, 452B are devices enabled with Bluetooth or wireless connectivity that connect to various other devices in the location, such as the local storage 418 and the electronic access control device at the access point 454. One or more of the electronic access control device at the access point 454, devices 452A and 452B, and local storage 418 can interface with the cloud 410 via network 420A, which can be an internet connection, for example, or other networks such as a telecommunications network. Local storage 418 can contain information such as events, a location map associated with the location, permissions similar to those in permission server 412 associated with the location 450, and other pertinent information. Local storage 418 can be part of one of the devices 452A and 452B or the access control device at the access point 454 or a separate storage system.

Cloud 410 can include one or more of the permission server 412, the event server 414, and the map server 416. Permission server 412 can store permissions associated with users of the system 400, such as the occupant associated with the occupant device 456 and the guest associated with the guest device 470. Permissions relate to the levels or types of access that individuals have to particular locations, such as the location 450. Event server 414 stores information related to event markers, such as, but not limited to, location information, physical location information within the location, service request types/categories, subtype information, timing information, author information, or other information. Map server 416 can store representations of various locations, such as the location 450, with which events can be associated. Guest device 470 can have access to the cloud 410 via the network 420A, and to one or more of the devices in location 450 using network 420B either remotely or locally. Networks 420A and 420B can be the same network or different networks.

During operation, occupants can store permissions in one or more of the permission server 412 and the local storage 418. Permissions specify whether individuals associated with the system 400 can access the system as an occupant or guest. Permissions can include more detailed permission information, such as when, how, where, and which event information the individual can access. Permissions can be associated, for example, with accounts registered with the system 400 and associated with individuals. It should be appreciated that the distinction between occupant and guest can be merely semantic, and can delineate varying tiers or levels of permissions with occupants having permissions above a specified threshold.

A physical map of the location 450 can be stored at one or more of the local storage 414 and the map server 416. According to some embodiments, a map of the location 450 can also be locally cached or stored on the occupant device 456 and/or the guest device 470. For example, since an occupant may have routine access to the location 450, the occupant can maintain a copy of the map locally on the device 456 in order to easily and seamlessly interact with the virtual environment and/or augmented environment in location 450 without having to load large data files from remote devices. However, since access by guests can be limited in the frequency or scope of their access, the system 400 can require the guests to retrieve the map for location 450 from the map server 416 or the local storage 418 only when they are in the location 450, and then require it to be deleted or render it unusable after expiration of their permission. The map can include a 3D or 2D representation of the location 450. According to some embodiments, the map is an actual representation of the 2D or 3D structure of the location 450 or a relative representation relative to various devices in the location 450. It can also have outer boundaries associated with the location defined for purposes of defining limits to where events can be placed and/or to determine when and where individuals are granted permission to the virtual environment and/or augmented environment in the location 450. According to some embodiments, when a map is not available, or when a guest or occupant does not have permission for the map of a particular location, an individual can access the system via simply using the lists shown above with respect to FIGS. 2 and 3B.

As discussed above, an occupant can create an event in the location 450 on the occupant device 456. Occupant device can determine the location on the map, for example, using a combination of one or more of GPS data, Bluetooth proximity/range finding/triangulation with one or more of the devices 452A/452B or the access control device which have fixed locations on the map, or other methods of determining physical location. The event can then be stored in one or more of the event server 414, local storage 418, and the occupant device 456 in association with this physical location. According to some embodiments, only some of the information associated with the event is transmitted to the event server 414 so as to maintain private information such as physical location information and/or recorded messages in only more secure locations like the local storage 418 and/or occupant device 456.

After creating the event, the occupant can interact with it using the occupant device 456. According to some embodiments, the event server 414 can communicate service requests based on the event to guests, such as the guest in possession of guest device 470. According to some embodiments, the guest can be a predetermined contact for particular service request types. According to some additional embodiments, this communication can take the form of a marketplace in which registered or approved guests bid for a price to complete service requests. Still according to other embodiments, the event server simply routs the service request to a particular guest input by the occupant at the time of event creation (for example, via inputting a guest email, phone number, or account information). Optionally, the system 400 can also provide an update to permissions server 412 to allow the contacted guest access to the access point 454 and/or to view particular subsets or types of events in the virtual environment and/or augmented environment 340 within the location 450.

As discussed above, the guest can gain access to the location 450 and complete service requests at the location 450 by interacting with the virtual environment and/or augmented environment 340 via the guest interface 470. According to some embodiments, access at the access point 454 is granted automatically based on updated permissions in the permissions server 412, for example as described in more detail in U.S. application Ser. No. 15/342,911. As discussed above, the guest's access can be limited to particular locations at particular times and to viewing particular types of events based on the permissions in permission server 412. The guest can also respond to particular service requests by marking them as completed and/or attaching messages.

According to some embodiments, one or more of event server 414 and local storage 418 can track statistics about events. For example, metrics like completion rate, occupant satisfaction, cost of completion, cost of providing service to occupants per event or per occupant, or other useful metrics. Accordingly, the system 400 may learn more about how events are responded to, and how to better match guests to particular service requests. Other uses for this information are contemplated.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter can be made without departing from the spirit and scope of the disclosed subject matter, which is limited only by the claims which follow.

The invention claimed is:

1. A method comprising:
   displaying, on a user interface of a mobile device, at least one image of a portion of an area;
   receiving, via the user interface, a selection at a point on the at least one image of the portion of the area;
   identifying a physical location of the point in the portion of the area on the at least one image by locating a corresponding location on a virtual map representing the area;
   determining, based on at least one permission stored in a permissions database, that the user is authorized to submit a service request to perform an event at at least one of the identified physical location or the area;
   displaying, on the user interface, an event marker associated with the event at the point on the at least one image of the portion of the area;
   displaying, on the user interface, two or more service request types;
   receiving, via the user interface, a second selection of at least one service request type of the two or more service request types; and
   storing, in an event database, the event based on the second selection comprising:
   an indication of the identified physical location, and
   an indication of the at least one service request type.

2. The method of claim 1, further comprising updating, in the permissions database, one or more permissions to enable a service provider to gain access to the event.

3. The method of claim 1, further comprising updating, in the permissions database, one or more permissions to enable a service provider to gain access to an access point associated with the at least one of the physical location or the area in response to the second selection of the at least one service request type.

4. The method of claim 1, further comprising receiving, via the user interface, at least one of video or text instructions associated with the at least one service request type.

5. The method of claim 1, further comprising:
   displaying, on the user interface, at least one service request subtype; and receiving, via the user interface, a selection of one or more of the at least one service request subtype.

6. The method of claim 1, further comprising displaying, on the user interface, at least one of a second event marker associated with a second event stored in the event database or a direction to a second event marker associated with a second event stored in the event database.

7. The method of claim 1, further comprising displaying an event list on the user interface, the displayed event list comprising:
a list entry associated with the event; and
a list entry associated with at least one second event stored in the event database.

8. The method of claim 1, wherein the virtual map representing the area comprises a virtual 3D map of the area.

9. The method of claim 1, wherein the user interface comprises a touch screen with a graphical display.

10. The method of claim 1, wherein at least one of the event database or the permissions database are in a location remote from the area.

11. The method of claim 1, wherein at least one of the event database or the permissions database are within the area.

12. A method comprising:
receiving, by a user mobile device, at least one image of a portion of an area from at least one camera of the user mobile device;
identifying a physical location of the portion of the area in the at least one image;
determining, based on at least one permission stored in a permissions database, that a user of the user mobile device is authorized to view events associated with at least one of the identified physical location or the area;
identifying, in at least one event database, the events having associated locations to perform the events, wherein each of the associated locations is at least one of the identified physical locations of the portion of the area in the at least one image or the area;
displaying, on a graphical user interface (GUI) of the user mobile device, an interactive event marker associated with an event overlaid in the identified physical location in the at least one image, the interactive event marker comprising an identifier to identify a type of service of the event and the interactive event marker to indicate a point in the identified physical location where the event is to occur;
receiving, from the user of the user mobile device, a selection of the interactive event marker; and
displaying, on the GUI, information associated with the event associated with the event marker.

13. The method of claim 12, further comprising granting access to an access point associated with the area based on the at least one permission stored in the permissions database.

14. The method of claim 12, wherein the identifying, in the at least one event database, events having an associated location at the identified physical location of the portion of the area in the at least one image comprises transmitting a request for a list of events based on at least one of the identified physical location or the area.

15. The method of claim 12, wherein the identifying the physical location of the portion of the area in the at least one image comprises locating a corresponding location on a virtual map representing the area.

16. The method of claim 12, wherein the information comprising one or more of video, text instructions, an indication of a device associated with the event, or a combination thereof.

17. The method of claim 12, further comprising displaying, on the user interface, a direction to at least one second interactive event marker associated with a second event stored in the at least one event database.

18. A computing system, comprising:
memory to store instructions; and
a processor coupled with the memory, the processor configured to process the instructions, that when executed, cause the processor to:
display, on a user interface of a mobile device, at least one image of a portion of an area;
receive, via the user interface, a selection at a point on the at least one image of the portion of the area;
identify a physical location of the point in the portion of the area on the at least one image by locating a corresponding location on a virtual map representing the area;
determine, based on at least one permission stored in a permissions database, that the user is authorized to submit a service request to perform an event at least one of the identified physical location or the area;
display, on the user interface, an event marker associated with the event at the point on the at least one image of the portion of the area;
display, on the user interface, two or more service request types;
receive, via the user interface, a second selection of at least one service request type of the two or more service request types; and
store, in an event database, the event based on the second selection comprising:
an indication of the identified physical location, and
an indication of the at least one service request type.

19. The computing system of claim 18, wherein the instructions are further configured to cause the processor to update, in the permissions database, one or more permissions to enable a service provider to gain access to the event.

20. The computing system of claim 18, wherein the instructions are further configured to cause the processor to update, in the permissions database, one or more permissions to enable a service provider to gain access to an access point associated with the at least one of the physical location or the area in response to the second selection of the at least one service request type.

21. The computing system of claim 18, wherein the instructions are further configured to cause the processor to receive, via the user interface, at least one of video or text instructions associated with the at least one service request type.

22. The computing system of claim 18, wherein the instructions are further configured to cause the processor to:
display, on the user interface, at least one service request subtype; and
receive, via the user interface, a selection of one or more of the at least one service request subtype.

23. The computing system of claim 18, wherein the instructions are further configured to cause the processor to display, on the user interface, at least one of a second event marker associated with a second event stored in the event database or a direction to a second event marker associated with a second event stored in the event database.

24. The computing system of claim 18, wherein the instructions are further configured to cause the processor to display an event list on the user interface, the displayed event list comprising:
  a list entry associated with the event; and
  a list entry associated with at least one second event stored in the event database.

25. The computing system of claim 18, wherein the virtual map representing the area comprises a virtual 3D map of the area.

26. The computing system of claim 18, wherein the user interface comprises a touch screen with a graphical display.

27. The computing system of claim 18, wherein at least one of the event database or the permissions database are in a location remote from the area.

28. The computing system of claim 18, wherein at least one of the event database or the permissions database are within the area.

29. A computing system, comprising:
  memory to store instructions; and
  a processor coupled with the memory, the processor configured to process the instructions, that when executed, cause the processor to:
    receive, by a user mobile device, at least one image of a portion of an area from at least one camera of the user mobile device;
    identify a physical location of the portion of the area in the at least one image;
    determine, based on at least one permission stored in a permissions database, that a user of the user mobile device is authorized to view events associated with at least one of the identified physical location or the area;
    identify, in at least one event database, the events having associated locations to perform the events, wherein each of the associated locations is at least one of the identified physical locations of the portion of the area in the at least one image or the area;
    display, on a graphical user interface (GUI) of the user mobile device, an interactive event marker associated with an event overlaid in the identified physical location in the at least one image, the interactive event marker comprising an identifier to identify a type of service of the event and the interactive event marker to indicate a point in the identified physical location where the event is to occur;
    receive, from the user of the user mobile device, a selection of the interactive event marker; and
    display, on the GUI, information associated with the event associated with the event marker.

30. The computing system of claim 29, wherein the instructions are further configured to cause the processor to granting access to an access point associated with the area based on the at least one permission stored in the permissions database.

31. The computing system of claim 29, wherein the instructions are further configured to cause the processor to identify, in the at least one event database, events having an associated location at the identified physical location of the portion of the area in the at least one image comprises transmitting a request for a list of events based on at least one of the identified physical location or the area.

32. The computing system of claim 29, wherein the processor to identify the physical location of the portion of the area in the at least one image comprises locating a corresponding location on a virtual map representing the area.

33. The computing system of claim 29, wherein the information comprising one or more of video, text instructions, an indication of a device associated with the event, or a combination thereof.

34. The computing system of claim 29, wherein the instructions are further configured to cause the processor to display, on the user interface, a direction to at least one second interactive event marker associated with a second event stored in the at least one event database.

* * * * *